United States Patent [19]

Baliozian

[11] 4,428,029

[45] Jan. 24, 1984

[54] LIGHT GATHERING DEVICE FOR TRANSMITTING LIGHT FROM A FLASH TO AN OPTICAL FIBER BUNDLE FOR PHOTOGRAPHING SMALL OBJECTS, AND DEVICE INCORPORATING SAME

[75] Inventor: Mardick Baliozian, Feucherolles, France

[73] Assignee: BALCAR, Paris, France

[21] Appl. No.: 340,693

[22] Filed: Jan. 19, 1982

[30] Foreign Application Priority Data

Jan. 30, 1981 [FR] France .................. 81 01804

[51] Int. Cl.³ ........................... G03B 15/02
[52] U.S. Cl. ........................ 362/12; 362/17; 362/18; 362/32; 362/216; 362/224; 362/228; 362/232; 362/235; 362/281; 362/321
[58] Field of Search ............... 362/12, 17, 18, 32, 362/216, 224, 228, 232, 235, 281, 321

[56] References Cited

U.S. PATENT DOCUMENTS

| | | | |
|---|---|---|---|
| 2,922,873 | 1/1960 | Bibbero et al. | 362/32 X |
| 3,142,235 | 7/1964 | Siegmund | 362/32 |
| 3,648,118 | 3/1972 | Yano et al. | 362/32 |
| 3,825,336 | 7/1974 | Reynolds | 362/32 X |
| 4,053,756 | 10/1977 | Takahashi | 362/32 X |
| 4,085,436 | 4/1978 | Weiss | 362/32 X |
| 4,129,898 | 12/1978 | Ohrstedt | 362/32 |
| 4,268,141 | 5/1981 | Mori et al. | 362/32 X |
| 4,366,529 | 12/1982 | Takahashi | 362/322 |

Primary Examiner—Stephen J. Lechert, Jr.
Attorney, Agent, or Firm—Young & Thompson

[57] ABSTRACT

A light-gathering device for transmitting through fiber optic bundles, the light emitted by an electronic flash along with the light from a continuous light source so that relatively small objects may be lit so as to photograph them. A first housing (8) is provided, designed to receive a flash tube (1) of an electronic flash unit, and a "model"(3) emitting continuous light, the first housing (8) being enclosed within a second housing in which there are several openings for inserting the ends of fiber optic bundles (2) whose opposite ends are used for illuminating the object to be photographed. Manual shutters (5, 6, 7) are provided for varying the light intensity from the flash tube to the fiber optics (2). This light gathering device is suitable for taking top-quality color photographs which have the desired lighting effects.

13 Claims, 3 Drawing Figures

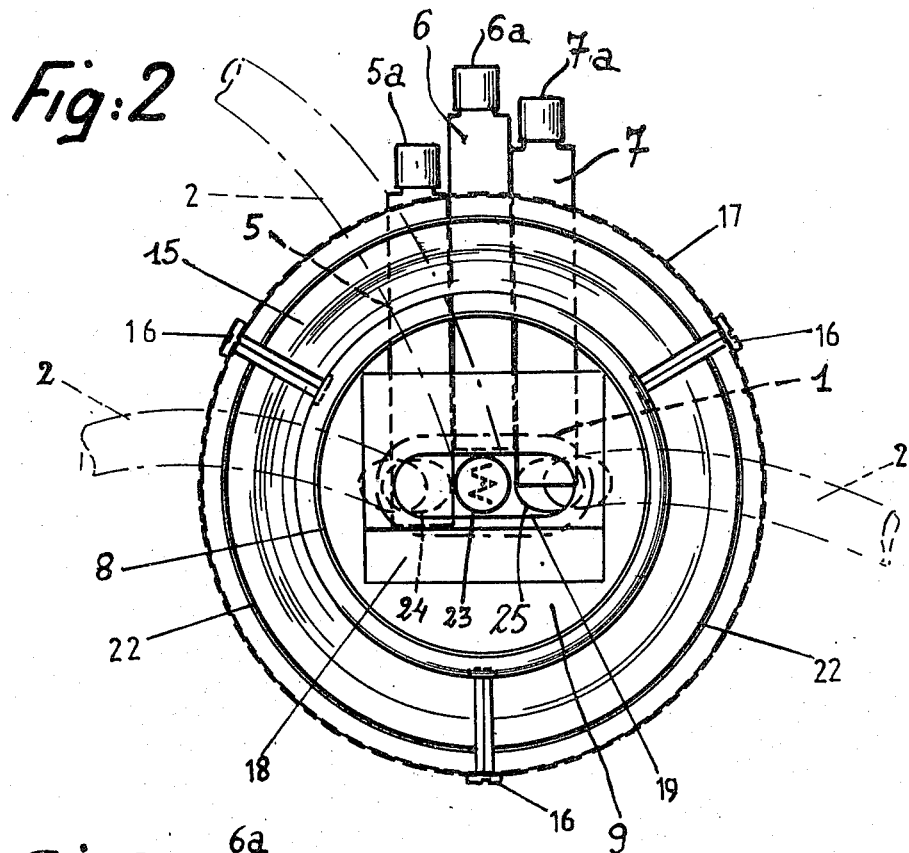
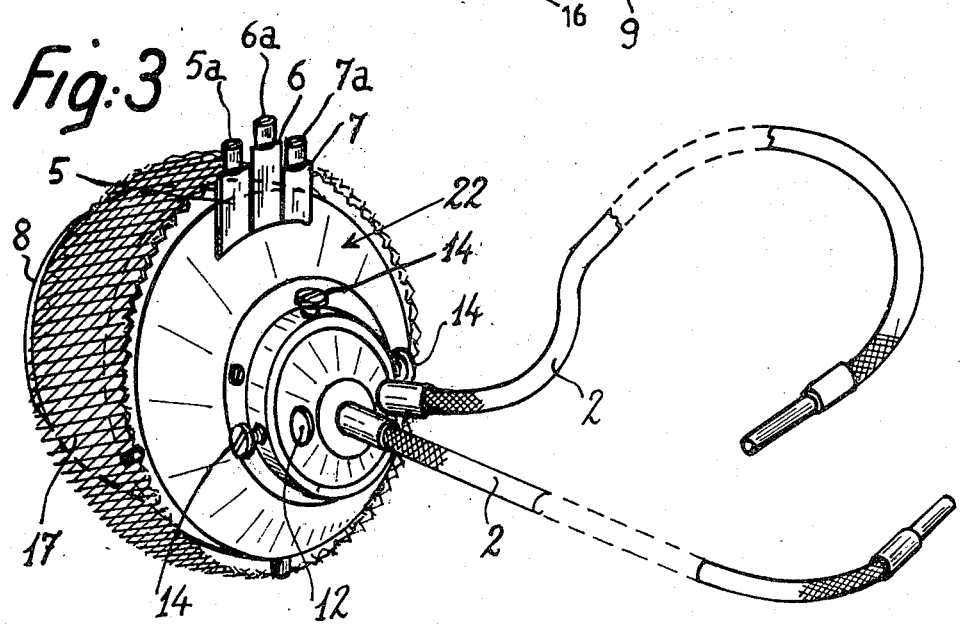

LIGHT GATHERING DEVICE FOR TRANSMITTING LIGHT FROM A FLASH TO AN OPTICAL FIBER BUNDLE FOR PHOTOGRAPHING SMALL OBJECTS, AND DEVICE INCORPORATING SAME

BACKGROUND OF THE INVENTION

The present invention relates to a light gathering device adapted to transmit the light from the flash tube of an electronic flash unit to at least one optical fiber bundle, for taking photographic pictures of small objects such as coins, stamps or objects examined through a microscope, for example in medical or scientific work.

THE PRIOR ART

Many devices have already been proposed for picking up light through optical fiber bundles; in some of these known devices the fibre ends are simply disposed in the vicinity of the light source, while other devices use small-diameter dichroic mirrors for reflecting the light emitted by the filament of a bulb and concentrating this light onto the ends of optical fibers. The efficiency of the optical fiber bundle is thus increased but it can only be used with light sources comprising relatively small incandescent filaments, so that their use in color photography is limited considerably.

Due to the many advantages characterizing the use of an electronic flash unit as a light source for color photography, it is particularly desirable to have the possibility of gathering the light emitted from a flash tube and to transmit it through an optical fiber bundle to the object to be photographed. However, two main difficulties have prevented up to now the development of this technique:

(a) a large amount of light is necessary for taking a photographic color picture of an object to be subsequently enlarged considerably, by using a single flash, since the amount of light striking the focal plane decreases as $(M+1)^2$ (M being the image to object ratio). Optical fibres are utilized only for illuminating small objects to be reproduced with image-to-object ratios of $0.25\times$ to $50\times$ in color macrography and up to $2000\times$ in color microphotography.

(b) since an electronic flash unit emits only an instantaneous light beam, it is necessary to dispose of a sufficiently powerful source of continuous light coupled with the electronic flash unit and covering the same field in order to enable the operator to check what he is photographing and also to see the lighting effects on the subject being lit.

Other factors and elements should also be taken into account:

Thus, it is preferable that this device be incorporated as an accessory for existing electronic flash units, so that its cost can be kept as low as possible.

Also preferably, more than one fiber optical bundle should be used, and the light available at each outlet of each optical fiber bundle should conveniently be individually adjustable.

SUMMARY OF THE INVENTION

According to the present invention, the light gathering device is comprised by a housing with one side open so that the flash source of a light head along with its continuously emitting lamp, can be inserted inside it. This first housing is surrounded by a second housing having at least one opening adapted to receive one end of a fiber optic bundle the other end of which is used to light the object being photographed, means also being provided for varying the quantity of light received at the inlet end of the optical fiber bundle.

The flash tube may have any one of various configurations. For example, it may be U-shaped, circular, helical or straight. When it is U-shaped, circular or helical, a continuously emitting lamp in the form of a model lamp can be placed inside the flash tube thus permitting the operator to see the subject and the light effects on it.

The first and second housing are so designed that the inlet ends of the optical fiber bundles lie as close as possible to the flash tube in order to pick up the maximum amount of light therefrom.

According to a specific feature characterizing this invention, the flash tube, the model lamp and the opening for introducing the inlet ends of the fiber optic bundles are placed substantially in coplanar relationship, so that the optical fiber bundles can receive and transmit the maximum amount of light. This proper positioning may be obtained for example by coupling a male or female member inside the housing with a matching female or male member of the electronic flash light head.

Thus, the inlet ends of the optical fibers may be disposed along a circular arc and the model lamp in this case is placed at the center of this arc, the flash tube lying between this model lamp and the optical fiber bundles.

Thus, the light gathering device according to this invention constitutes an accessory which can be easily and rapidly set up for operation, and mounted on an electronic flash unit in order to serve several optical fiber bundles suitably disposed in relations to the flash tube.

Other features and advantages characterizing this invention will appear as the following description proceeds with reference to the attached drawings illustrating diagrammatically by way of example various forms of embodiment of the light gathering device of this invention.

THE DRAWINGS

FIG. 2 is a front elevation view of a typical form of embodiment of a gathering device comprising three optical fiber bundles, and FIG. 3 is a perspective view showing the gathering device of FIG. 2, as seen from the cover side.

DESCRIPTION OF THE PREFERRED EMBODIMENTS

Figure 1:
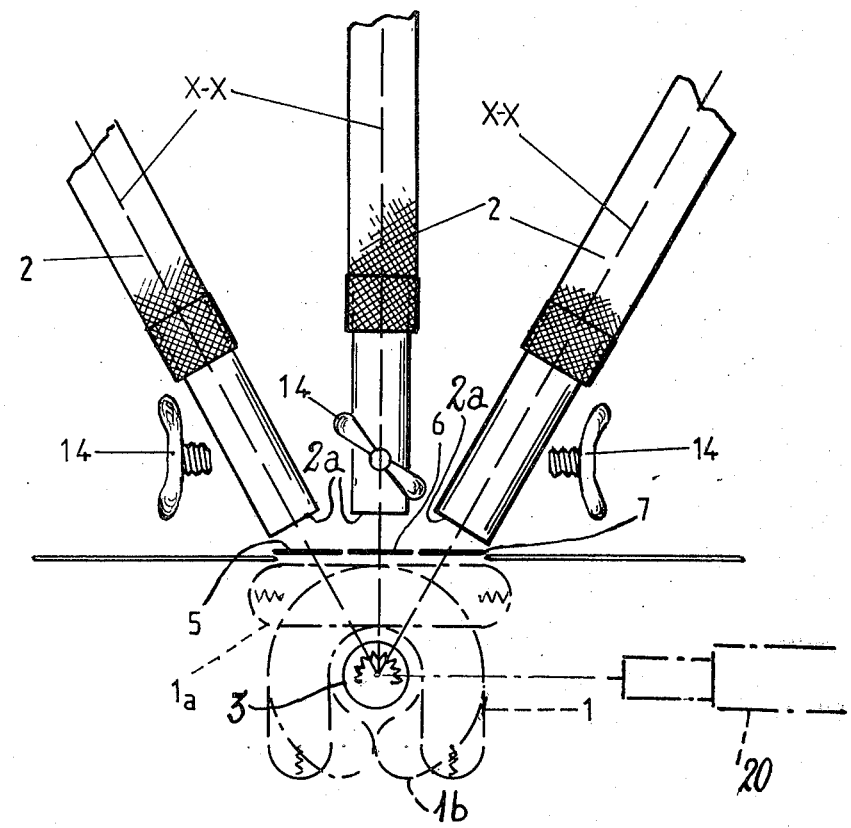
FIG. 1 is a simplified plan view showing the basic principle of two forms of embodiment of the light gathering devices according to the present invention.

The light gathering device illustrated diagrammatically in FIG. 1 is intended for transmitting the light emitted from a flash tube 1 of an electronic flash unit (not shown) to three optical fiber bundles 2 for taking color photographs of small objects, for example coins, stamps or objects observed through a microscope.

The light emitted by each flash produced in flash tube 1 is thus collected by one or all of the optical fiber bundles 2 whose outlet ends light the object being photographed.

The flash tube 1 has the shape of a rounded U-shape, or a substantially torus configuration 1b, with its circular portion disposed in close proximity to the inlet ends 2a of fiber bundles 2; however, other configurations may be used: thus, a straight flash tube 1a is also shown, and if desired a helical tube may also be used.

The light gathering device also comprises a continuously emitting model lamp 3 placed at the center flash tube 1 or 1b, or behind straight tube 1a.

Flash tube (1, or 1a, or 1b), model lamp 3 and the input ends 2a of optical fiber bundles 2 lie substantially in a common plane, so that the optical bundles 2 can receive and transmit a maximum amount of light. More particularly, the input ends 2a of optical fiber bundles 2 are disposed around the flash tube (1, 1a, 1b) on a circular arc, whereby the axes X—X of the rigid end portions of fiber bundles 2 converge at the centre of model lamp 3. Of course, the number of optical fiber bundles may vary within the limits set by the space available along the flash tube (1, 1a, 1b), and additional optical fiber bundles such as the lateral fiber bundle 20 of FIG. 1 may be disposed around the flash tube 1. The total number of fiber optical bundles depends also on the position of the model lamp 3.

Input ends 2a are disposed as close as possible to the flash tube (1, 1a, 1b) in order to pick up a maximum amount of the light emitted by it, and also of the light emitted continuously by the central guide lamp or bulb 3, to enable the operator to see clearly the object to be photographed and the effects produced thereon by the light transmitted through the optical fiber bundles 2.

The light gathering device further comprises means for varying the amount of light transmitted to the fiber bundles 2, said means consisting for instance, as shown in the drawings, of movable shutters 5, 6, 7 (FIGS. 2 and 3) disposed between the inlet ends 2a of fiber bundles 2 and the two light sources 1 and 3. The shutters 5, 6, 7 are adjustable manually in order to vary the intensity of the light coming from light sources 1, 3 to the optical fiber bundles 2. Thus, by adjusting the lateral shutter 5 disposed between a lateral optical fiber bundle 2 and the light sources 1, 3 the operator can regulate at will the amount of light received by this lateral optical fiber bundle 2, and the other shutters 6 and 7 control the light transmitted to the central optical fiber bundle 2 and to the other lateral optical fiber bundle 2, respectively.

The shutters 5, 6, 7 should be as thin as possible, in order to minimize the space occupied thereby since it is essential that the inlet ends 2a of the optical fiber bundles 2 be disposed as close as possible to the flash tube 1 or 1a.

A typical form of embodiment of a light gathering device according to the present invention is illustrated in FIGS. 2 and 3 of the drawings.

This light gathering device comprises an inner or first housing 8 having an open side to permit the fitting of the flash tube 1, 1a or 1b together with the model lamp 3 into an inner chamber 9 of housing 8. This first housing 8 is surrounded concentrically by an outer or second housing 22, an annular air gap 15 being provided between the two housings to limit the transmission of heat generated by the model lamp 3 from the first or inner housing 8 to the second or outer housing 22. The latter has several holes 12 formed through its back wall, each hole being adapted to receive the input end of a corresponding optical fiber bundles 2 so that the input end faces 2a of the fibres can be properly set in relation to light sources 1 and 3.

Optical fiber bundle 2 are held securely in their selected operative position by any suitable means such as set screws 14 adapted to engage the end portions of the optical fiber bundles 2 through the outer housing 22. This outer housing is attached to inner housing 8 by means of suitable means (not shown). Spaces 16 are provided for attaching an annular screen 17 surrounding the outer housing 22. With this arrangement the operator is safely protected against the risk of burning his fingers on the outer wall of housing 22 due to the heat generated by the model lamp 3. In fact, only a small amount of heat is transmitted through the spacers 16 and outer screen 17.

In the bottom of the inner chamber 9, between the front face of the flash tube and the inlet end 2a of optical fiber bundles 2, a transverse plate 18 is secured to the inner housing 8 through any suitable means. An elongated aperture 19 formed through this plate is coplanar with flash tube 1 or 1a and also with holes 12. This aperture 19 may be closed partially or completely by means of the adjustment shutters 5, 6 each of which is associated with a specific optical fiber bundle 2. Furthermore, each adjustable shutter is provided with a separate control knob 5a, 6a and 7a of heat-insulating material.

Another plate (not shown in the drawings) is disposed behind the transverse plate 18 and has three holes 23, 24 and 25 formed therethrough (FIG. 1) in order to permit the passage of the light beams towards the corresponding optical fiber bundles 2.

In the exemplary form of embodiment of the light gathering device of this invention illustrated in FIG. 2, the device holds three optical fiber bundles 2. In the example of FIG. 3, since only two fiber optical bundles 2 are fitted to the light gathering device, and the shutter of the missing fiber bundle is therefore normally closed.

In order to position properly the flash tube 1, 1a or 1b and model lamp 3 in relation to the optical fiber bundles 2, the inner housing 8 may advantageously be provided with a male or female member (not shown) adapted to fit on a matching female or male member of the electronic flash light head.

The mode of operation of the light gathering device according to this invention will be readily understood by those conversant with the art from the above description.

With this light gathering device, very small objects can be photographed with the amount of light necessary for obtaining top quality color photographs. The amount of light received by each optical fiber bundle is easily adjusted by actuating the sliding shutters associated with the optical fiber bundles.

Of course, this invention should not be construed as being strictly limited by the specified forms of embodiment as described and illustrated herein, since many modifications and changes may be made without departing from the basic principles of the invention. Thus, the number of optical fiber bundles and the configuration of the flash tube are immaterial, and furthermore any suitable means equivalent to those described hereinabove may be used within the scope of the present invention for limiting the overheating of the fiber optical bundles.

I claim:

1. A light gathering device for taking photographic pictures of small objects, which comprises a first inner housing (8) having an open side permitting the insertion of a flash (1, 1a, 1b) of an electronic flash unit into an inner chamber of said housing (8), a said flash in said inner chamber, adapted continuously to emit light, said first housing (8) being surrounded by a second outer housing (22) having at least one opening (12) through its wall for receiving the input end (2a) of at least one bundle of optical fibers (2), the other end of the bundle constituting a light source for illuminating the object to be photographed, and means (5, 6, 7) for adjusting the intensity of the light received by said input end of said optical fiber bundle (2).

2. The light gathering device of claim 1, wherein said flash (1, 1a, 1b) lamp (3) and the input ends (2a) of said optical fiber bundle (2) are disposed substantially in a common plane so that the optical fiber bundle (2) can receive and transmit a maximum amount of light.

3. The light gathering device of claim 1, wherein said means for varying the light intensity received by said optical fiber bundle (2) comprises a manually operated shutter (5, 6, 7) slidably mounted in front of an aperture (19) formed in a plate (18) mounted in front of said second housing (22) between said optical fiber bundle (2) and said flash (1, 1a, 1b).

4. The light gathering device of claim 3, wherein said first inner housing (8) is separated from the second outer housing (22) by an air gap, and a heat-protecting annular member (17) disposed around said second housing (22).

5. The light gathering device of claim 1, wherein said flash is a flash tube.

6. The light gathering device of claim 1, there being a plurality of said bundles of optical fibers disposed at an angle to each other and whose input ends converge at said lamp.

7. The light gathering device of claim 6, and an individually operable shutter between the flash and the lamp, on the one hand, and the input end of each optical fiber bundle, on the other hand.

8. A device for taking photographic pictures of relatively small objects, having a light gathering device according to claim 1.

9. A light gathering device for taking photographic pictures of small objects, which comprises a plurality of bundles of optic fibers (2) having input ends (2a) disposed in a common plane, an electronic flash in the form of a flash tube (1, 1a, 1b) disposed in said plane, and a lamp (3) adapted continuously to emit light, said lamp being disposed on the side of said flash tube opposite said input ends of said bundles of optic fibers.

10. The light gathering device of claim 9, and an individually operable shutter between the flash and the lamp, on the one hand, and the input end of each optical fiber bundle, on the other hand, there being one said shutter individual to each said optical fiber bundle.

11. The light gathering device of claim 9, in which said input ends converage at said lamp.

12. A light gathering device for taking photographic pictures of small objects, which comprises a plurality of bundles of optical fibers (2), an electronic flash (1, 1a, 1b) and a lamp (3) adapted continuously to emit light, said lamp and flash being disposed adjacent the inlet ends (2a) of said optical fiber bundles, said inlet ends being disposed at an angle to each other and converging as said lamp.

13. The light gathering device of claim 12, and an individually operable shutter between the flash and the lamp, on the other hand, and the input end of each optical fiber bundle, on the other hand, there being a said shutter individual to each said input end.

* * * * *